United States Patent [19]

Yamanaka et al.

[11] Patent Number: 5,049,872

[45] Date of Patent: Sep. 17, 1991

[54] REMOTE SUPERVISORY CONTROL SYSTEM

[75] Inventors: Torao Yamanaka; Hirofumi Morimoto; Takeshi Kawahara, all of Hyogo, Japan

[73] Assignee: Mitsubishi Denki Kabushiki Kaisha, Tokyo, Japan

[21] Appl. No.: 576,088

[22] Filed: Aug. 31, 1990

Related U.S. Application Data

[63] Continuation of Ser. No. 228,124, Aug. 4, 1988, abandoned.

[30] Foreign Application Priority Data

Sep. 14, 1987 [JP] Japan .................................. 62-228370

[51] Int. Cl.⁵ .............................................. H04B 3/00
[52] U.S. Cl. ........................... 340/825.05; 340/825.02; 340/825.08
[58] Field of Search ....................... 340/825.05, 825.08, 340/825.02; 370/85.4, 85.5, 91, 95.2, 85.15

[56] References Cited

U.S. PATENT DOCUMENTS

| Re. 31,852 | 3/1985 | Soderblom | 370/85.15 |
| 4,427,968 | 1/1984 | York | 340/825.02 |
| 4,482,999 | 11/1984 | Janson et al. | 370/85.5 |

OTHER PUBLICATIONS

"IEEE Tutorial Course, Fundamentals of Supervisory Control Systems", 12/1981, pp. 33-35.
R. G. Herrtwich, "Koordination in Iolaken Netzen", 12/1986, pp. 440-443.

*Primary Examiner*—Donald J. Yusko
*Assistant Examiner*—Dervis Magistre
*Attorney, Agent, or Firm*—Rothwell, Figg, Ernst & Kurz

[57] ABSTRACT

A slave station at an end location of a transmission route is responsive to a polling signal issued from a master station such that if there exist data to be sent to the master station, the slave station transmits a code with a "busy" token and specifying the data to a slave station at the next upper location; and if there do not exist data to be sent to the master station, the slave station transmits a "free" token to the slave station at the next upper location. When the slave station at the upper location receives the "busy" token from the station at the lower location, the slave station at the upper location relays the entire codes receives. If the "free" token is received and when there exist data to be sent to the master station, the slave station replaces the "free" token with the "busy" token and subsequently sends the obtained data; and if there do not exist data to be sent to the master station, the slave station relays the "free" token to a slave station at the next upper location or the master station.

5 Claims, 6 Drawing Sheets

REMOTE SUPERVISORY CONTROL SYSTEM

This is a continuation of application Ser. No. 07/228,124, filed Aug. 4, 1988, now abandoned.

BACKGROUND OF THE INVENTION

1. Field of the Invention

The present invention relates to a remote supervisory control system including a master station and a plurality of slave stations sharing transmission paths.

2. Description of the Prior Art

Conventionally, in a remote supervisory control system including a master station and slave stations sharing transmission paths, means adopted in most cases as a method to avoid an interference due to simultaneous call initiations from a plurality of slave stations is a polling system in which the master station sequentially calls the slave stations. An example of codes to be exchanged between the master station and slave stations in such a case is described in pages 33 to 35 of the "IEEE TUTORIAL COURSE Fundamentals of Supervisory Control Systems".

FIG. 1 is a block diagram, for example, showing an example of the constitution of the conventional remote supervisory control system which exchanges codes as described in the literature above. In this diagram, 0 is a master station, 1, 2, ..., and N indicate slave stations, 01, 10, 12, 21, 23, 32, ..., MN, and MN are transmission paths or routes connecting between the master station 0 and the respective slave stations 1, 2, ..., and N.

In the master station, 0, 001 indicates a central processing circuit, 002 denotes a display output circuit, 003 represents an input circuit to input signals to the central processing circuit 001, 004 indicates a display panel to display the contents of outputs from the display output circuit 002, 005 denotes a control console, 006 designates a code transmission circuit, and 007 represents a modulation circuit to modulate an output from the code transmission circuit 006.

The constitution further includes a code reception circuit 008 and a demodulation circuit 009 which demodulates a signal transmitted from the slave station 1 through the transmission route 10 and sends the resultant signal to the code reception circuit 008.

Furthermore, in the slave station 1, 100 stands for a central processing circuit, 101 indicates an output circuit to output signals to pertinent devices, 102 designates an input circuit to input signals from the pertinent devices, 103 denotes a branch circuit to effect a branching of a modulated signal delivered via the transmission path 01 between a descending signal amplifier circuit 104 and a demodulation circuit 105.

Reference numeral 106 stands for a code reception circuit and 107 denotes a code transmission circuit which encodes, based on a instruction from the central processing circuit 100, signals inputted to the input circuit 102. Reference numeral 108 indicates a modulation circuit which modulates an output from the code transmission circuit 107 in accordance with an instruction from the central processing circuit 100. Reference numeral 109 denotes an insertion circuit and 110 stands for an ascending signal amplifier circuit. The insertion circuit 109 inserts an output from the modulation circuit 108 and outputs the resultant signal to the ascending signal amplifier circuit 110.

The configuration of the components in each slave station ranging from the sleeve station 2 to the slave station N is completely the same as the slave station 1, and the hundreds digit of the number assigned to each element represents a slave station number, whereas the tens digit and the units digit designate the corresponding circuit.

Although a descending signal amplifier circuit N04 associated with the slave station N is unnecessary at an end position, it is convenient to provide the descending signal amplifier circuit N04 for the standardization of the apparatus and for an addition of a slave station in the future.

Next, the operation of FIG. 1 will be described by also referring to the timing chart of FIG. 2. In the master station 0 of FIG. 1, the central processing circuit 001 instructs the code transmission circuit 006 to sequentially transmit a polling signal to the respective slave stations 1 to N in a continual fashion, and the code transmission circuit 006 passes a polling signal by serial codes to the modulation circuit 007 based on the instruction.

The modulation circuit 007 receives the signal and effects a modulation such as a frequency shift keying, FSK modulation so as to transmit the resultant signal via the transmission path 001 to the slave station 1.

In the slave station 1, the branch circuit 103 receives the signal and achieves a branching operation thereof to the demodulation circuit 105 and the descending signal amplifier circuit 104.

The demodulation circuit 105 demodulates a received signal and supplies the resultant signal to the code reception circuit 106. On the other side, the descending signal amplifier 104 amplifies the signal undergone attenuations in the transmission path 01 and the branch circuit 103 to a predetermined level and sends the obtained signal via the transmission path 12 to the slave station 2.

Also in the slave station 2, the same operation is accomplished as that effected in the slave station 1; furthermore, in the similar fashion, the polling signal transmitted from the code transmission circuit 006 of the master station 0 is received by the code reception circuits 106, 206, ..., N06 of the respective slave stations 1 to N.

The polling signal sent from the code transmission circuit 006 of the master station 0 is as shown in FIG. 2 (00) which includes a synchronization bit as the first information followed by an address ($A_1$, $A_2$, etc.) specified, a function code (F indicating a polling signal in this case), an error detection code S, and a code end bit as the final information.

When the code transmission circuit 006 of the master station 0 of FIG. 1 sends a polling signal shown in the upper-left corner of FIG. 2 (00), the polling signal reaches the code reception circuit 106, 206, ..., N06 of the respective slave stations 1 to N as described above; however, since an address part $A_1$ specifies the slave station 1, the central processing circuits 200, ..., N00 of the other slave stations 2 to N decode the address and do not carry out the transmission, namely, only the central processing circuit 100 of the slave station 1 first sends a carrier wave of the modulation circuit 108 and subsequently causes the code transmission circuit 107 to transmit a response signal to the master station 0.

At the present stage, since any particular status change is not found, the response signal only includes an address $A_1$ of the own location and a function code (F indicating that there does not exist any status change in this case) as shown in FIG. 2 (01). This code information reaches the demodulation circuit 009 of the master station 0 through the insertion circuit 109, the ascending signal amplifier circuit 110, and the transmission path 10 and is then demodulated therein so as to be supplied to the code reception circuit 008.

On receiving the demodulated signal, the code reception circuit 008 sends an interruption signal to the central processing circuit 001, which in response to the interruption signal reads the received content of the code reception circuit 008.

Since the received content thus read out does not particularly indicate a fact that a status change has taken place, the central processing circuit 001 instructs the code transmission circuit 006 to send a polling signal specifying the slave station 2.

The code transmission circuit 006 converts the signal into serial codes [refer to FIG. 2 (00)] and sends the codes via the modulation circuit 007 to the transmission route 01. This polling signal also reaches the code reception circuit 106, 206, ..., N06 of the respective slave stations 1 to N, like in the case of the specification of the slave station 1 described above; however, since the address part $A_2$ specifies the slave station 2 in this case, the central processing circuit 200 of the slave station 2 first causes the carrier wave of the modulation circuit 208 to be transmitted and then causes the code transmission circuit 207 to send a response signal to the master station 0.

Since there is not found any particular status change in the slave station 2 in this situation, the signal includes, like in the case of the slave station 1, only the address $A_2$ of the own location, the function code F, and the error detection code S. [Refer to FIG. 2(02) for details.]

When the response signal is received via the code reception circuit 008, the central processing circuit 001 of the master station 0 then instructs the code transmission circuit 006 to send a polling signal specifying the slave station 3.

The polling operation is repeatedly effected in the similar fashion up to the slave station N as shown in FIG. 2(00) and FIG. 2(01) to (0N), and then the polling operation returns to the slave station 1 again. If there does not exist any status change in the slave stations, the operations above are repeatedly achieved in a cyclic fashion.

Under the condition above, in a case where a status change (such as an automatic trip of a breaker) occurs in the slave station 1, as shown in the codes from the upper-right corner to the lower-left corner of FIG. 2, when a polling signal from the master station 0 specifies the slave station 1 (by use of the address $A_1$), the central processing circuit 100 of the slave station 1 instructs the code transmission circuit 107 to set the function code F to notify an occurrence of the status change and to subsequently transmit the data (the position number and the direction of the change of the device associated with the status change).

On receiving the signal of the instruction above, the code transmission circuit 107 sends the codes shown in FIG. 2(01) to (11). When the code reception circuit 008 receives this information in the master station 0, the central processing circuit 001 reads the information and then conducts a warning operation via the display output circuit 002, for example, to light and flicker the pertinent display lamp of the display panel 004 and to sound a bell.

After this operation, the central processing circuit 001 instructs the code transmission circuit 006 to send a polling signal specifying the slave station 2 and then continuously achieves the polling operation for the other slave stations.

Next, in a case where the operator at the control console 005 effects an operation to control a device of the slave station N, the central processing circuit 001 reads the operation input via the input circuit 003 and instructs the code transmission circuit 006 to send the control instruction data (the position number and the direction of the control of the pertinent device) with the slave station address code set as N and the function code F set as the control instruction.

On receiving the instruction, the code transmission circuit 006 sends the code shown in FIG. 2(10), namely, shown in the central position of the top of lower lines. Like in the case of the polling signal, these codes are also received by the code reception circuits 106, 206, ..., N06 of the respective slave stations; however, the central processing circuit N00 of the slave station N detects that the instruction is transmitted to the own station and then outputs the control instruction via the output circuit N01 to the pertinent device based on the data portion of the received codes.

As a result, when the pertinent device issues a response, the result of the response is inputted to the input circuit N02, and then the central processing circuit N00 reads the result and instructs the code transmission circuit N07 to send codes notifying the status change associated with the response to the master station 0. On receiving the instruction, the code transmission circuit N07 sends the codes shown in FIG. 2(1N).

In the master station 0, the code reception circuit 008 receives the codes and then lights, like in the case of the state change described above, the pertinent display lamp of the display panel 004 via the output circuit 003 so as to display the response of the pertinent device to the operator.

In this case, since the central processing circuit 001 has stored information that the control instruction has been sent to the pertinent device, the status change thus received is regarded as a response thereto and consequently the central processing circuit 001 does not carry out the warning operation such as for the flicker of the display light and the sounding of a bell.

Thereafter, the central processing circuit 001 instructs the code transmission circuit 006 to send a polling signal for the slave station 1 and then returns to the ordinary state to effect the polling to the respective slave stations.

Incidentally, in a case where a considerable period of time is required for the response of the pertinent device in the slave station N, the central processing circuit N00 of the slave station N first may issue a response that the control instruction has been received and the response of the pertinent device is carried out when the next polling signal is received.

Furthermore, so-called "two action control method is commonly used in which the control operation is not achieved at a time, namely, a selecting operation of a device is first conducted and then after the selecting operation is confirmed, the control instruction is transmitted.

Since the conventional remote supervisory control system is constituted as described above, the master station 0 sequentially sends the polling signal to the respective slave stations 1 to N, which then effect operations responsive to the polling signal; consequently, a long period of time is required to elapse since a slave station has a chance to communicate with the master station until the slave station has the next chance to achieve a communication therewith. As a result, when a status change takes place immediately after the communication chance, the pertinent slave station must wait for the next chance for a quite a long period of time, which leads to a problem that the display and the warning report associated with the status change are delayed at the master station.

On the other hand, there has been adopted, as a method not having a disadvantage inherent to the polling system above, a so-called token passing method. (For details, refer to the Automatisierungstechnische Praxis apt, 28, Jahrgang, Heft 9, 1986 Sec. 2,c) Token Ring and d) Token Bus.) However, as also described in the literature above, this method is suitable for a case where the transmission paths are formed in a ring shape or a bus shape, and the functions of all stations are equalized excepting the function to monitor whether or not the transmission is being correctly carried out; consequently, although this method is suitable for a local area network (LAN) system in which the transmission routes are disposed in a ring form or a bus form shared in the private system location, there remains a problem that this system is not suitably applicable to a remote supervisory control system in which transmission routes are connected in a linear form or in a branching configuration through a long distance in an ordinary case and the master station and the slave stations are functionally separated from each other to achieve contrastive operations.

SUMMARY OF THE INVENTION

It is therefore an object of the present invention to solve the problems above in which there is provided a remote supervisory control system according to a novel method capable of transmitting a status change in a slave station to the master station at a high speed while sustaining the functions and features of the polling method.

In a remote supervisory control system according to the present invention, there are disposed a master station and a plurality of slave stations sharing transmission paths connected to the master station, and the slave station includes a token transmission and relay circuit which assigns a "busy" token when there exists data to be transmitted from the slave station to the master station in response to a polling signal and which assigns a "free" token when there does not exist the data to be transmitted to the master station.

The other objects and other advantages of the present invention will become apparent from the detailed description of the embodiments taken in conjunction with the accompanying drawings.

BRIEF DESCRIPTION OF THE DRAWINGS

The present invention will be apparent from the following detailed description taken in conjunction with the accompanying drawings in which.

DETAILED DESCRIPTION OF THE PREFERRED EMBODIMENTS

Figure 3:
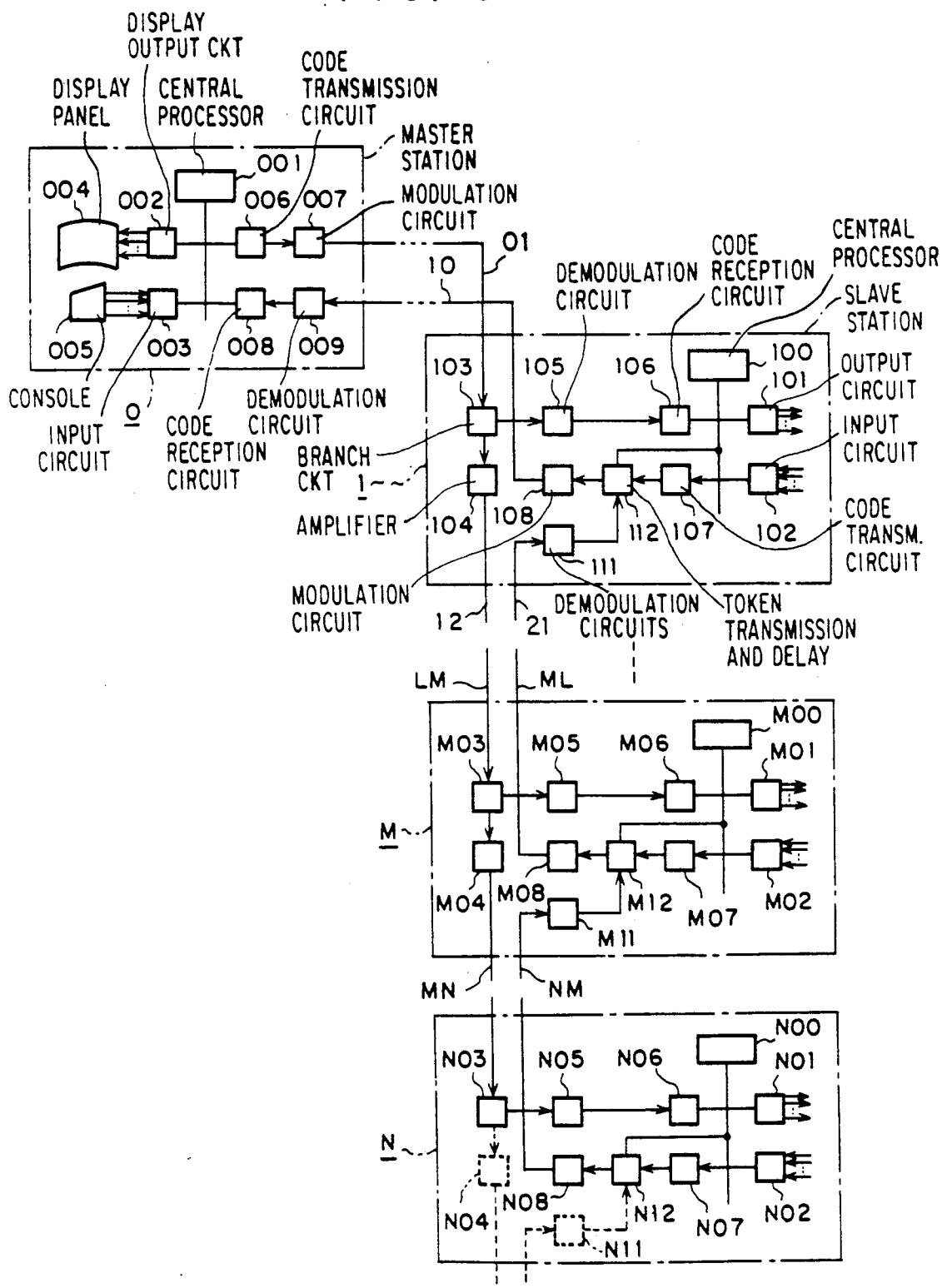
FIG. 3 is a block diagram schematically showing the configuration of the remote supervisory control system as an embodiment according to the present invention.

Referring to the drawings, a description will be given of an embodiment according to the present invention. In FIG. 3, the blocks assigned with the same number as those of FIG. 1 denote the respectively corresponding functional blocks. Incidentally, for convenience of the description, there is shown, in place of the slave station 2, a slave station (M=N-1) located at the next higher position as compared with the slave station N.

Figure 1:
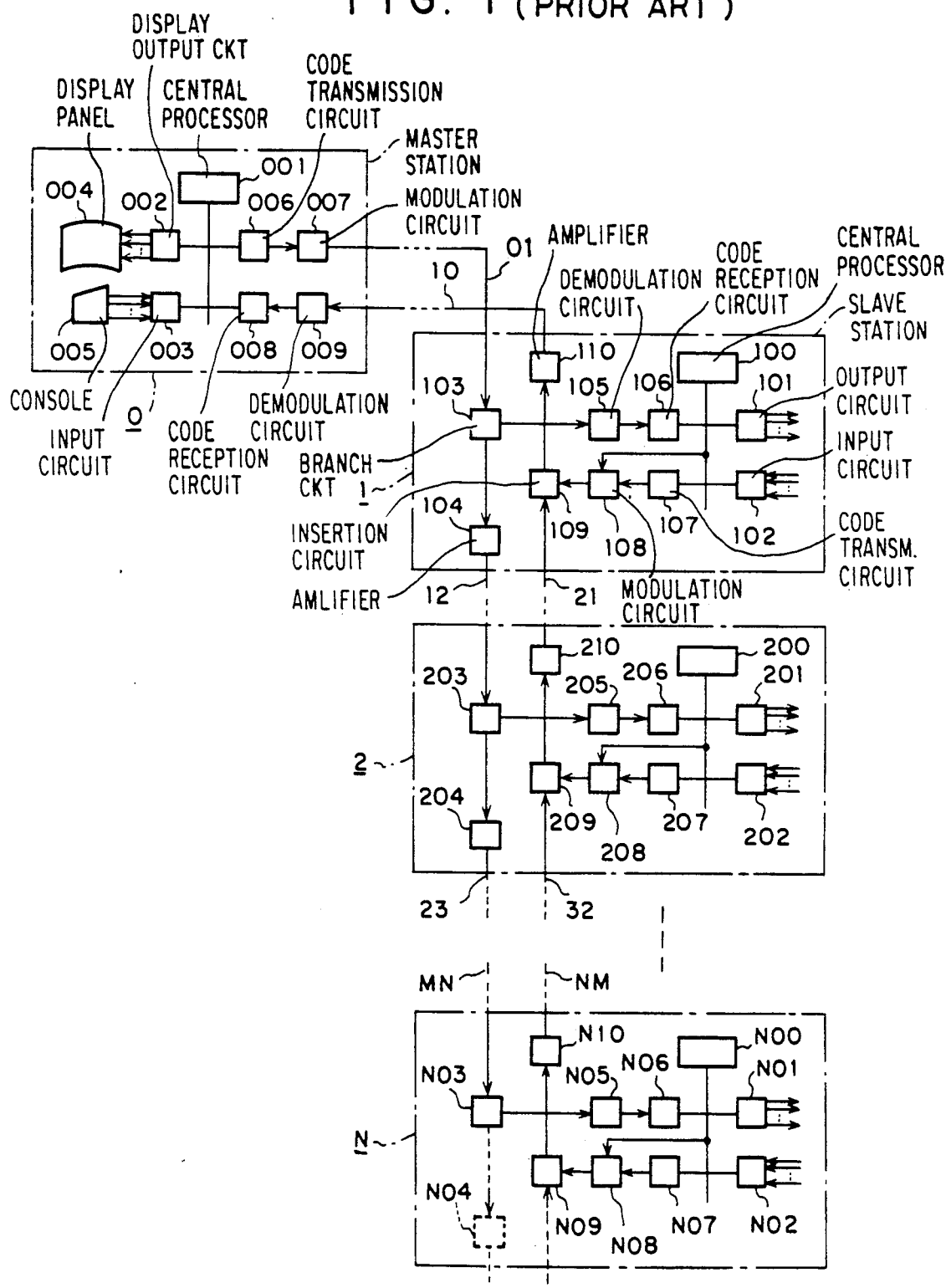
FIG. 1 is a schematic block diagram showing the configuration of the convention remote supervisory control system.

Blocks 111, ..., M11, and N11 and blocks 112, ..., M12, and N12 which are not shown in FIG. 1 are demodulation circuits and token transmission and relay circuits, respectively. The token transmission and relay circuits 112, ..., M12, and N12 are respectively configured such that the "free" token and the "busy" token are outputted according to the instructions from the central processing circuits 100, ..., M00, and N00, respectively.

The demodulation circuits 111, ..., M11, and N11 respectively demodulate outputs from modulation circuits 208, ..., N08, and (N+1)08 (not shown) so as to send the resultant signals to the token transmission and relay circuits 112, ..., M12, and N12, respectively. NM represents a transmission path.

Incidentally, in the slave station N, the descending signal amplifier circuit N04 and the demodulation circuit N11 are unnecessary at the end station; however, these provisions are convenient for the standardization of the apparatus and the addition of a slave station in the future.

Next, the operation of the configuration of FIG. 3 will be described with reference to the timing chart of FIG. 4. In the master station 0 of FIG. 3, the central processing circuit 001 instructs the code transmission circuit 006 to continually send a polling signal without specifying a particular slave station, and then the code transmission circuit 006 passes a polling signal to the modulation circuit 007 based on the instruction.

Figure 4:
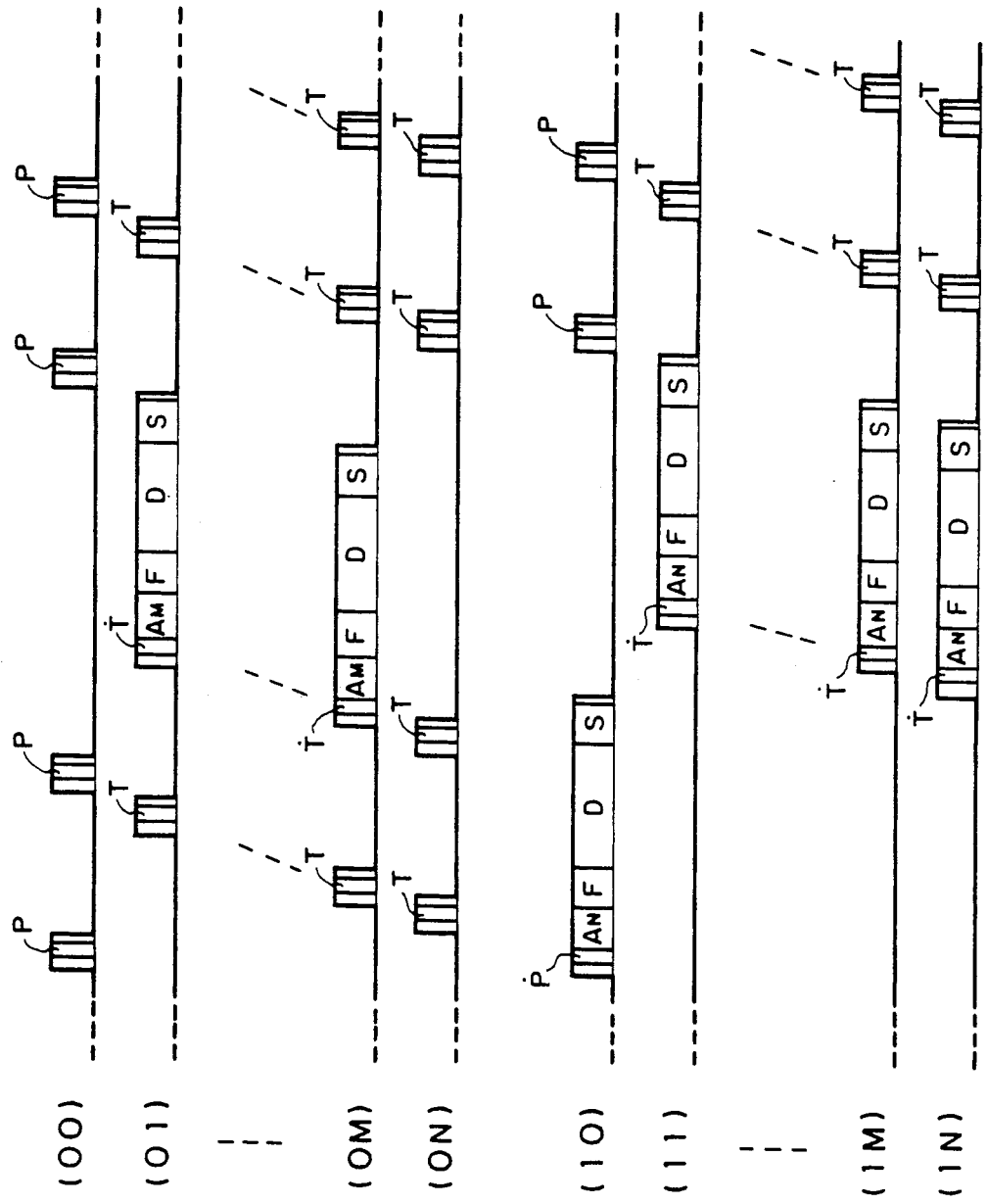
FIG. 4 is a timing chart showing an example of the operation of the system illustrated in FIG. 3.

An example of the polling signal to be transmitted from the code transmission circuit 006 is like that shown in (00) of FIG. 4, namely, in the upper-left position thereof. The transmission signal comprises a synchronization bit followed by a code P (for example "01") indicating a polling signal not specifying a particular slave station and a final bit "1" indicating the end of the codes.

The modulation circuit 007 modulates the polling signal passed from the code transmission circuit 006 and transmits the modulated signal via the transmission path 01 to the slave station 1. Subsequently, through an operation similar to the operation effected in the case of FIG. 1, the polling signal reaches the code reception circuits 106, ..., M06, and N06 of the respective slave stations 1 to N.

The central processing circuits 100, ..., M00, and N00 of the respective slave stations 1, ..., M, and N read the codes respectively received by the code reception circuits 106, ..., M06, and N06 and recognize that the received polling signal does not contain information specifying a particular slave station.

When the central processing circuit N00 of the slave station N at the end position detects that the polling signal above is received, the central processing circuit N00 instructs the token transmission and relay circuit N12 to send a "free" token T (for example "10") as shown in FIG. 4(ON) if there does not exist any data to be transmitted to the master station 0; or to send a "busy" token Ṫ (for example, "01") if there exists any data to be transmitted to the master station 0 thereafter, the central processing circuit N00 instructs the code transmission circuit N07 to encode and transmit the pertinent data.

Assuming here that there does not exist any particular data to be transmitted to the master station 0 in this situation, the token transmission and relay circuit N12 only sends the "free" token; consequently, the codes to be transmitted include, as shown in FIG. 4 (ON), a synchronization bit, the "free" token T, and the end bit. The code information is modulated in the modulation circuit N08 and is passed via the transmission route NM to the slave station M.

In the slave station M, the demodulation circuit M11 demodulates the code information and passes the resultant signal to the token transmission and relay circuit M12. On receiving the signal, the token transmission and relay circuit M12 notifies the central processing circuit M00 that the content includes the "free" token. If there does not exist also in the slave station M any particular data to be transmitted to the master station 0 in this state, the central processing circuit M00 instructs the token transmission and relay circuit M12 to relay the received "free" token for the further transmission.

In response to the instruction, the token transmission and relay circuit M12 sends such codes shown in FIG. 4(0M). The code signal is modulated by the modulation circuit M08 and then the resultant signal reaches, via the transmission path, ML the slave station L (L=M−1, not shown).

If there does not exist any particular data to be transmitted to the master station 0 in the slave stations L to 2, in the sequent operation, the "free" token is similarly passed via the transmission path 21 to the slave station 1 and is then demodulated by the demodulation circuit 111; thereafter, the demodulated signal is transferred to the token transmission and relay circuit 112.

Also in the slave station 1, if there does not exist any particular data to be sent to the master station 0 in this situation, the "free" token is relayed for the further transmission as shown in FIG. 4 (01), and the obtained signal is demodulated by the demodulation circuit 108 so as to be delivered via the transmission route 10 to the master station 0.

In the master station 0, the received signal is demodulated by the demodulation circuit 009 and is then passed to the code reception circuit 008, which in turn feeds the content of the received signal to the central processing circuit 001. In the central processing circuit 001, it is confirmed that there does not exist in any slave station any particular data such as a device status change to be transmitted to the master station 0 and then the code transmission circuit 006 is instructed to continuously sent the next polling signal.

If there does not exist in any slave station any particular data to be transmitted to the master station 0, the operation above is repeatedly accomplished. Assume here that there occurs, in the slave station M, particular data such as the device status change to be transmitted to the master station 0. In this case, when the "free" token sent from the slave station N arrives at the slave station M in the next polling operation, the central processing circuit M00 instructs the token transmission and relay circuit M12 to change the received "free" token T into the "busy" token Ṫ for the further transmission, and then instructs the code transmission circuit M07 to continuously achieve the data transmission.

Figure 2:
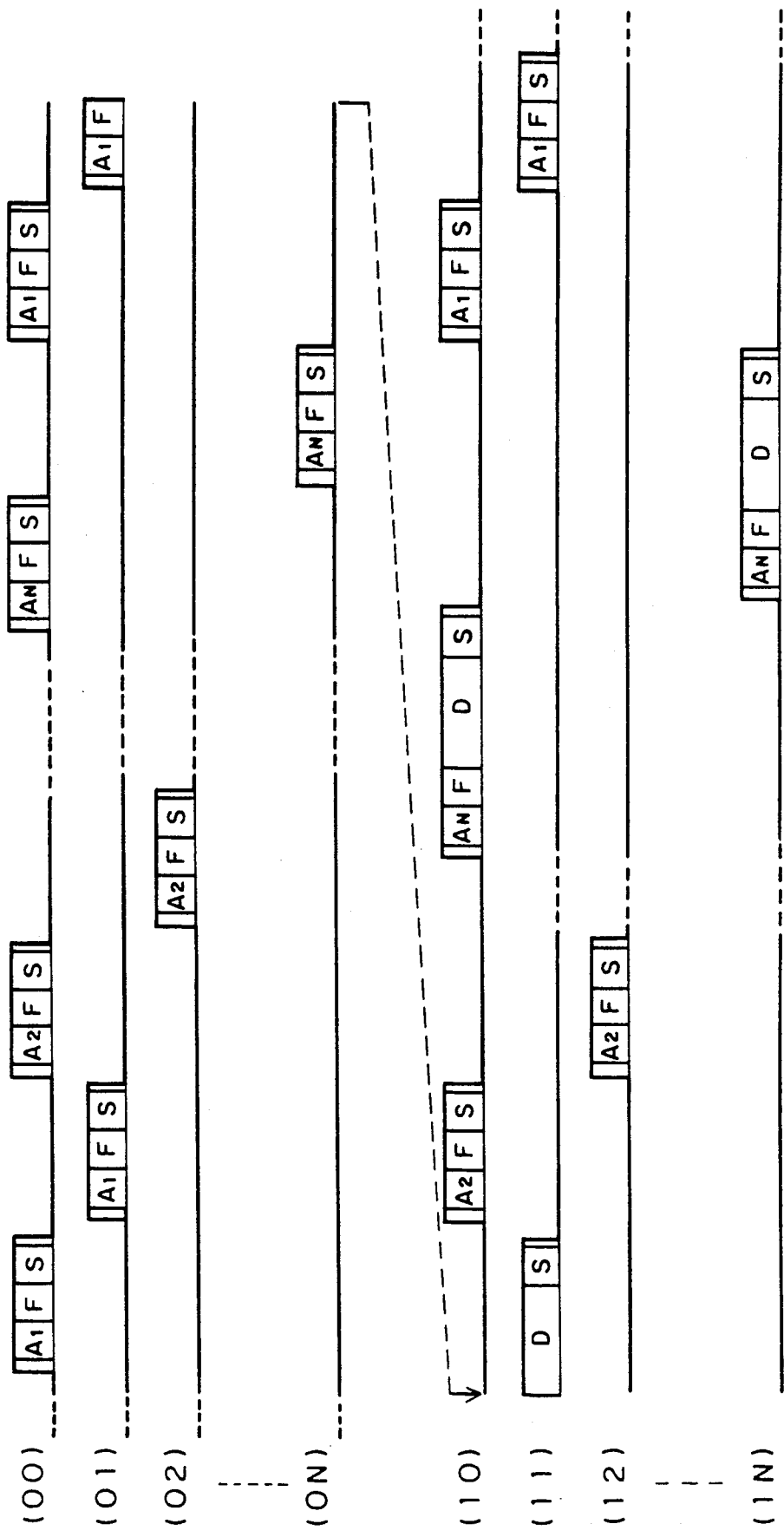
FIG. 2 is a timing chart showing the operation of the system of FIG. 1.

The token transmission and relay circuit M12 transmits, based on the instruction from the central processing circuit M00, a code signal as shown in the second item of FIG. 2(0M) including a synchronization bit, the "busy" token, a slave station address, a function code (representing the status change occurrence), data (the device position number and change direction of the device associated with the status change), and the error detection code.

The code signal is modulated by the modulation circuit M08 and is then passes via the transmission route ML to the slave station L (not shown). Since the code signal is assigned with the "busy" token Ṫ, the slave station L relays the code signal without any particular operation, and subsequently, the code signal reaches the slave station 1 in the similar fashion. In the slave station 1, the code signal is also relayed such that the codes shown in the second item it FIG. 4(01) are delivered to the master station 0 and then the codes are demodulated by the demodulation circuit 009 so as to be received by the code reception circuit 008.

The central processing circuit 001 read the codes received by the code reception circuit 008 and thereafter lights and flickers via the display circuit 002 the pertinent display lamp if the display panel 004 and conducts a warning operation, for example, by means of a bell.

After the operation above, the central processing circuit 001 instructs the code transmission circuit 006 to send a polling signal, thereby repeatedly achieving the ordinary operation as shown in FIG. 4(00).

Next, when the operator at the control panel 005 effects an operation to control a device of the slave station N, the central processing circuit 001 reads the operation input via the input circuit 003 and instructs the code transmission circuit 006 to send codes associated with a polling signal including code Ṗ (for example, 01) specifying a particular slave station followed by an address (A_N) of the slave station N to be specified, a function code (F indicating a control instruction in this case), and data of the control instruction (the position number and control direction of the pertinent device).

On receiving the instruction, the code transmission circuit 006 sends the codes shown in FIG. 4(10). These codes are also received by the code reception circuits 106, ..., M06, and N06 of the respective slave stations like in the case of the polling signal; however, the central processing circuit N00 of the slave station N detects that the instruction is issued to the own station and then outputs a control instruction, based on the data portion of the received codes, from the output circuit N01 to pertinent device.

When the pertinent device issues a response, the result is inputted to the input circuit N02. Thereafter, the central processing circuit N00 reads the content of the result and then instructs the token transmission and relay circuit N12 to send the "busy" token and further instructs the code transmission circuit N07 to send codes notifying the master station 0 a status change associated with the response.

Based on the instruction, the token transmission and relay circuit N12 and the code transmission circuit N07 achieve a transmission of the codes as shown in FIG. 4(1N).

The codes are modulated in the modulation circuit N08 and the resultant signal reaches the slave station M via the transmission route. Since the signal is assigned with the "busy" token, the central processing circuit M00 instructs the token transmission and relay circuit M12 to directly relay the signal, and consequently, the codes as shown in FIG. 4(1M) are transmitted from the slave station M. Subsequently, through the similar operation, the signal reaches the slave station 1, which also relays the signal via the transmission route 10 to the master station 0. The signal is then demodulated in the demodulation circuit 009 so as to be received by the code reception circuit 008. The central processing circuit 001 then reads the codes received by the code reception circuit 008 and lights the pertinent display lamp of the display panel 004 through the output circuit 002 in the similar fashion like that of the case of the status change described above, thereby displaying the response from the pertinent device to the operator. However, the flicker of the display lamp and the warning operation are not achieved by the same reason as described for FIG. 1.

In addition, the operation to be carried out when a considerable period of time is required for the response from the pertinent device and the availability of a method in which a selection of the pertinent device is effected so as to achieve the control operation after the selection is confirmed are also the same as those in the case of FIG. 1.

Incidentally, although the polling signal utilized in the embodiment above has a format different from the format of the ordinary polling signal, the similar operation can be accomplished by use of the ordinary polling signal. In this case, however, the scan period is slightly elongated.

Figure 5:
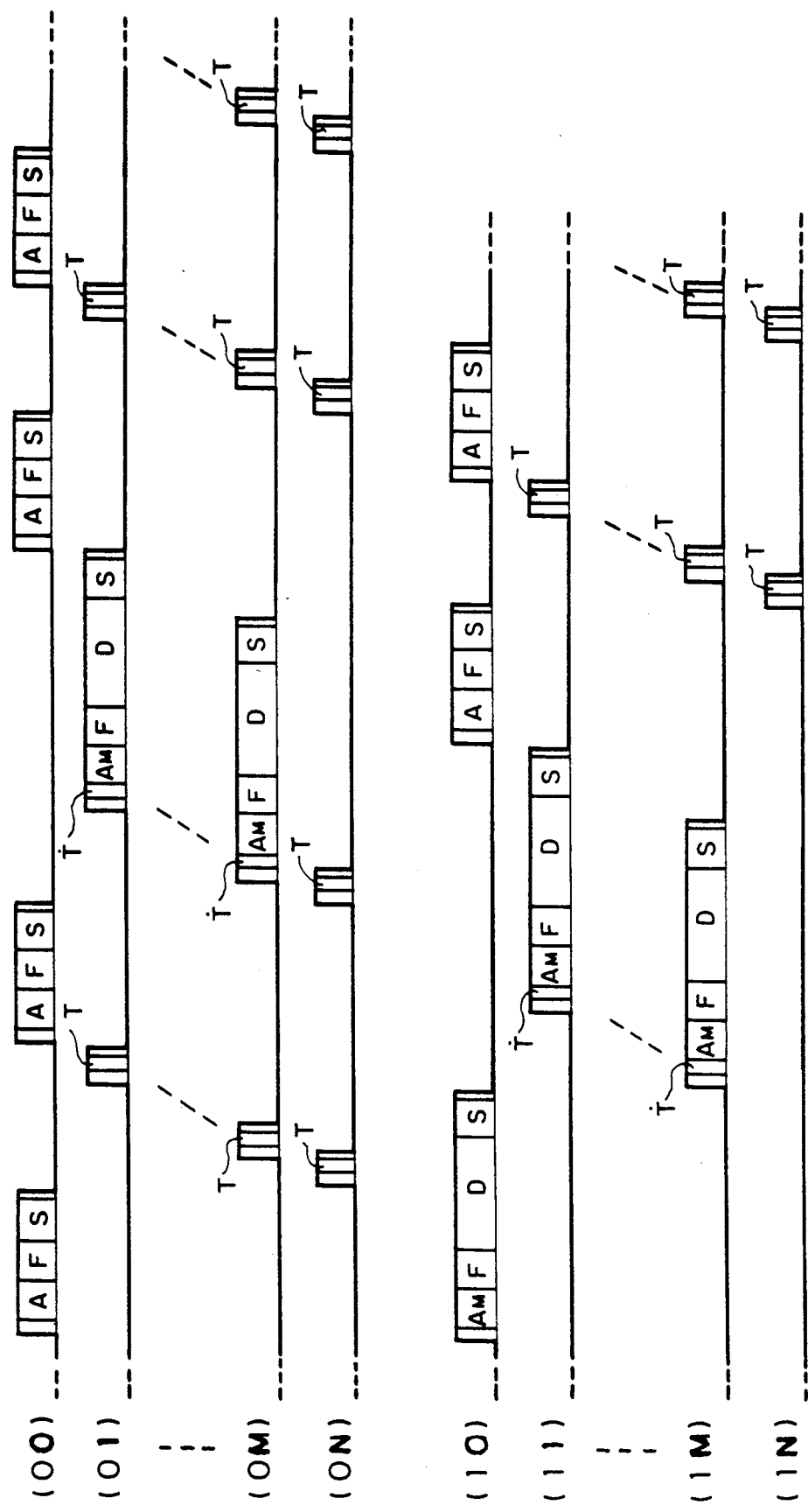
FIG. 5 is a timing chart showing another example of the operation of the system illustrated in FIG. 3.

FIG. 5 shows the timing chart of codes to be communicated between the master station and the respective slave stations. Comparing FIG. 5 with FIG. 4, the format of the polling signal sent from the master station 0 is the same as the ordinary format shown in FIG. 2; however, the address to specify a slave is set as an item not specifying a particular slave station (for example, "00000000").

On receiving the polling signal, the code transmission circuits 106, . . . , M06, and N06 of the respective slave stations carry out the same operation as the effected when the polling signal of the special format of FIG. 4 is received.

In a case where a control is to be achieved, there is transmitted a signal, as shown in FIG. 5(1M), comprising a slave address (specifying an address $A_M$ of the slave station M in this case), a function code (designating a control instruction), control data (the position number and the control direction of the pertinent device), and the error correction code.

For the notification of the response from the pertinent device, since a fact that the slave station M is specified by the polling signal has already been recognized by the central processing circuits 100, . . . , M00, and N00 of the respective slave stations, the central processing circuit M00 of the specified slave station M instructs the token transmission and relay circuit M12 to issue the "busy" token and instructs the code transmission circuit M07 to send data indicating a status change of the response.

Based on the instruction, the token transmission and relay circuit M12 and the code transmission circuit M07 send the codes shown in FIG. 5(1M), and then the slave stations in the upper locations relay the codes to the master station 0.

In addition, according to another method, in place of an operation not to specify a particular slave station in the slave station specifying address of the ordinary polling signal, there may be specified a slave station at an end location of the transmission path, thereby achieving the same operation.

Figure 6:
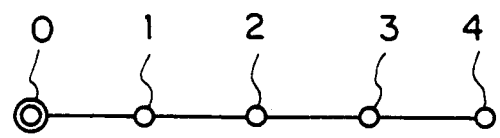
FIGS. 6 to 8 are schematic connection diagrams respectively showing exemplary connecting relationship between the master station and the slave stations to which the system according to the present invention is applied.
Figure 7:
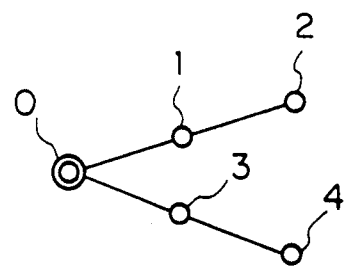
Figure 8:
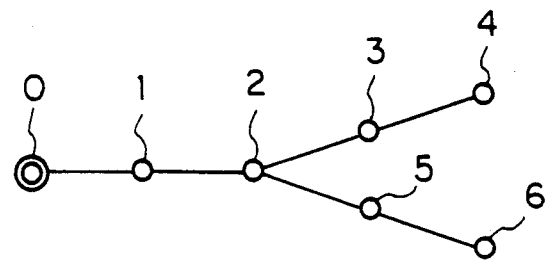

In the aforementioned embodiments, the master station and the respective slave stations are connected in a linear form, which can be schematically indicated as shown in FIG. 6; however, also in cases such as those of FIGS. 7 and 8 in which the master station and the respective slave stations are connected in a branching form, the aforementioned methods or a method in an expanded version thereof may also be applied to the system.

In one of such methods, a slave station connected at the end location of the transmission route is specified by the polling signal. In a case of FIG. 7, when the master station 0 specifies the slave station 2, the data of the slave stations 2 and 1 can be attained, whereas when the slave station 4 is specified, the data of the slave stations 4 and 3 can be obtained; consequently, it is only necessary to repeatedly specify the slave stations 2 and 4 in a continuous fashion.

Also in the case of FIG. 8, the data of all slave stations can be collected only by repetitively specifying the slave stations 4 and 6 in a consecutive manner.

Incidentally, in this situation, in both cases where the slave stations 4 and 6 are specified, the token passes through the slave stations 1 and 2, therefore the chance of data transmission for the slave stations 1 and 2 is doubled.

According to another method, the slave stations are classified into groups depending on the branch routes such that a group number is specified by the polling signal. This is, in the case of the format of the polling signal shown in the timing chart of FIG. 4, the polling signal P (10) not specifying a particular slave station need only be subdivided into a polling signal $P_1$ (10) specifying a first branch route (for the slave stations 1 and 2 in FIG. 7) and a polling signal $P_2$ (11) specifying a second branch path (for the slave stations 3 and 4 in FIG. 7.

In addition, when there exists many branch paths, the number of bits may be increased to obtain a high reliability.

Moreover, in the case of FIG. 5, there may be employed a method in which an address 00000000 and an address 11111111 specify the first and second branch routes, respectively.

In the case of FIG. 8, several methods can be adopted to classify the slave stations into groups. According to one of the methods, the slave stations are classified into three groups, namely, the slave stations 1 and 2 form the first group, the slave stations 3 and 4 constitute the second group, and the slave stations 5 and 6 construct the third group. In this case, if the polling is effected to the second or third group, the central processing circuits of the first group recognize the condition so as only to achieve a relay operation of the polling signal.

In addition, there may be employed a method to form two groups in which the slave stations 1 to 4 construct the first group and the slave stations 5 and 6 constitute the second group and a method in which the slave stations 1 to 4 form the first group and the slave stations 1, 2, 5, and 6 constitute the second group, namely, the slave stations 1 and 2 are included both in the groups 1 and 2 (the operation of this case is similar to that of the case where the station at the end location is specified).

Incidentally, the block diagram of FIG. 3 is only an embodiment according to the present invention and hence naturally does not restrict the present invention.

As described above, according to the present invention, the system is constituted such that even when the master station effects the polling for each slave station, the token is sequentially transferred from the slave station at the end location only by a polling operation; consequently, the period of time required for the slave station to notify the device status change to the master station is greatly minimized; in addition, there is attained an effect that like in the conventional polling method, the transmission of the ordinary polling signal specifying only a slave station as well as the transmission of a control instruction can be achieved.

What is claimed is:

1. A remote supervisory control system including a master station and a plurality of slave stations which are interconnected in a linear configuration and which share the transmission route connected to the master station and for which the presence and absence of data to be sent to the master station thereof are enquired by the master station wherein a master station is connected to a plurality of slave stations extending in a linear series interconnected sequence from the master station to an end slave station connected at the end location of the transmission route of said linear sequence, such that communication between said master station and said slave stations flows linearly in opposite directions through a communication path extending from said master station to said end slave station;

said slave station connected at the end location of the transmission route is responsive to a polling signal issued from the master station such that responsive to the presence of data to be sent to the master station, the slave station transmits a code with a "busy" token specifying the data so as to send the code to a slave station at the next upper location in the direction opposite to the direction of the initiation of transmission of said polling signal transmitted from the master station to the slave station and that responsive to the absence of data to be sent to the master station, the slave station at the end location transmits a code in said opposite direction with a "free" token to a slave station at the next upper location;

in slave stations connected at intermediate locations between said master station and said slave station at the end location, when a code with a "busy" token is received from a slave station at a lower location, the receiving slave station relays the entire code associated with the "busy" token in said opposite direction to a slave station at the further upper location or to the master station and when a code with a "free" token is received and there exist data to be sent to the master station, said slave station replaces the "free" token with the "busy" token and subsequently sends the code associated with the data and when there do not exist data to be sent to the master station, said slave station relays a code with a "free" token in said opposite direction to a slave station at the next upper location or to the master station.

2. A remote supervisory control system according to claim 1 wherein, said polling signal does not specify any particular slave station.

3. A remote supervisory control system according to claim 1 wherein said polling signal specifies a slave station at an end location.

4. A remote supervisory control system according to claim 1 wherein in a case where said transmission routes is in a branching form, said polling signal includes a code specifying a group of slave stations classified in a branch depending on the branching routes.

5. A remote supervisory control system according to claim 1 wherein in a case where said transmission routes is in a branching form, said polling signal includes a code specifying a slave station located at an end of each branch.

* * * * *

UNITED STATES PATENT AND TRADEMARK OFFICE
CERTIFICATE OF CORRECTION

PATENT NO. : 5,049,872
DATED : September 17, 1991
INVENTOR(S) : Torao Yamanaka et al.

It is certified that error appears in the above-identified patent and that said Letters Patent is hereby corrected as shown below:

Column 1, line 29, "MN" (second occurrence) should be --NM--;
    line 68, "sleeve" should be --slave--.

Column 2, line 24, "001" should be --01--.

Column 4, line 57, after "method" insert --"--.

Column 5, line 62, "convention" should be --conventional--.

Column 6, line 32, "208" should be --108--.

Column 8, line 21, "passes" should be --passed--;
    line 32, "read" should be --reads--.

Column 10, line 4, "instruction" should be --instructions--.

Column 12, line 6, "station" (second occurrence) should be
        --stations--;
    line 19, after "station" insert --,--.

Signed and Sealed this

Fifteenth Day of June, 1993

Attest:

MICHAEL K. KIRK

*Attesting Officer*    Acting Commissioner of Patents and Trademarks